No. 671,646.  
R. G. BAILEY.  
FRUIT GRADER.  
(Application filed July 24, 1900.)
Patented Apr. 9, 1901.
(No Model.)
*Fig. 1.*
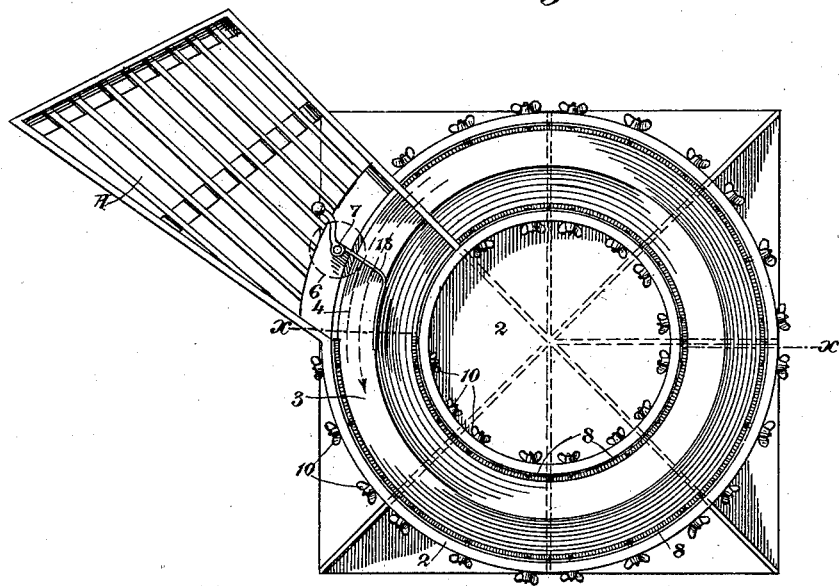
*Fig. 2.*
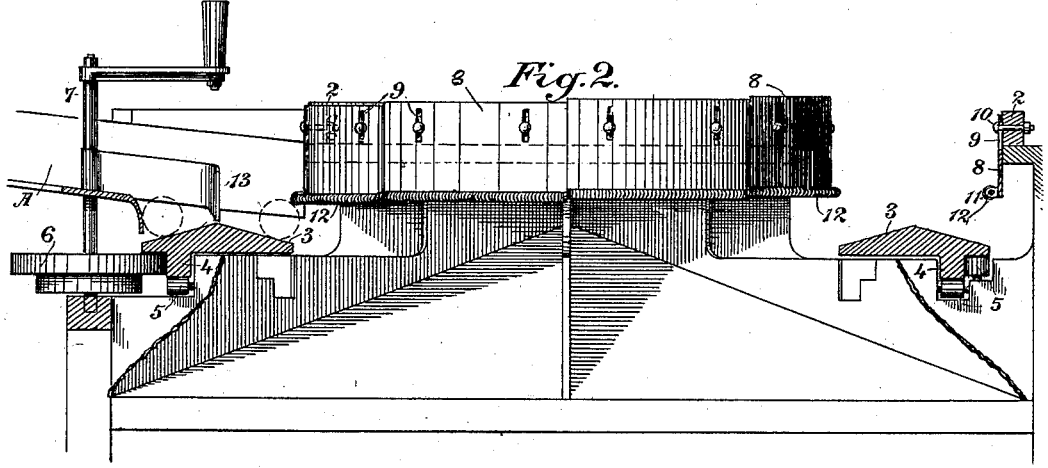
*Fig. 3.*
*Fig. 4.*
Witnesses,  
Inventor,  
Richard G. Bailey  
By Dewey Strong & Co.  
atts

UNITED STATES PATENT OFFICE.

RICHARD G. BAILEY, OF SAN MATEO, CALIFORNIA, ASSIGNOR TO GEORGE G. WICKSON, OF SAN FRANCISCO, CALIFORNIA.

FRUIT-GRADER.

SPECIFICATION forming part of Letters Patent No. 671,646, dated April 9, 1901.

Application filed July 24, 1900. Serial No. 24,653. (No model.)

*To all whom it may concern:*

Be it known that I, RICHARD G. BAILEY, a citizen of the United States, residing at San Mateo, county of San Mateo, State of California, have invented an Improvement in Fruit-Graders; and I hereby declare the following to be a full, clear, and exact description of the same.

My invention relates to an apparatus which is designed for the grading or assorting of fruits which are approximately globular in shape, such as oranges and the like.

It consists of a horizontally-rotating disk or ring with the rim or rims beveled or sloping from the upper surface downward, said disk or ring being made to rotate in a perfect plane, traveling on rollers placed underneath or from a central spindle, or both. Surrounding these rotating beveled rims is suspended a series of adjustable curved rollers so spaced in relation to the rotating beveled surface below them as to permit fruit approximately globular in shape to roll off in its proper place. The disk or ring is moved by any suitable mechanical device, so as to cause the fruit to travel around a circle on a continuous inclined plane until it finds a space below the curved-roller grading-guides of sufficient size to allow it to pass out to suitable receptacles. The curved-roller grading-guide consists of a sheet of metal or other substance bent to the proper curve and having slots to permit of adjusting its vertical position; also, having rigidly attached to its bottom edge a rod of similar curve, upon which rod is loosely journaled a series of rings or washers of metal or other substance which revolve freely as the fruit passes in contact with them; in conjunction with these a table suitably constructed for supporting and operating the rotating disk or ring and for holding in position the adjustable curved-roller grading-guides; also, a feed-chute through which the fruit is delivered to the rotating disk or ring and means for catching the fruit as it drops from its proper opening.

Referring to the accompanying drawings, Figure 1 is a plan view of my grader. Fig. 2 is a vertical section of the same on line $xx$ of Fig. 1. Fig. 3 is a similar view showing a rotating disk. Fig. 4 is a detail view of one of the guide-plates.

The fruit is first placed in a feed-chute A, having a bottom formed of longitudinal strips or grate-bars and a sufficient inclination so that the fruit will roll down over these bars. From the lower end of the chute the fruit is delivered upon a disk or ring 3, having inclined or beveled edges. If a disk with an exterior beveled edge is used, it is surrounded by an exterior adjustable guide; but if a ring is used it has double inclines in the form of a circular roof-shaped bottom 3, the apex of which is approximately central between the outer and inner guides which form the channel, in the lower part of which the ring is supported and turnable. The fruit received upon the ring or disk then lies upon the beveled surface or surfaces and against the exterior guide or guides, and is thus advanced and rotated by the revolution of the disk or ring, as hereinafter described.

The disk or ring 3 is supported upon and guided by roller-bearings, as at 5, and it is revoluble by any suitable mechanism. Such mechanism I have here illustrated in the form of a frictional roller 6, which contacts with the ring or with a rib 4 thereon, and which roller is turnable by a shaft, as at 7. The sides or guides against which the fruit rests are here shown in the form of sectional plates 8, which are slotted, as shown at 9, so that they may be adjusted vertically to project more or less below the supports 2, from which they are hung, being held in place by thumb-screws or equivalent devices, as at 10. It will also be manifest that the plates could be supported from vertical posts, to which the ends of the plates could be adjustably connected. These plates 8 are preferably set so as to form vertical offsets between each plate and the next one, so that the spaces from the point where the fruit enters the apparatus gradually increase around the circle, so that oranges or similar fruit rolling along on the beveled edges of the disk or ring will rest against the lower edges of the plate or a series of rollers to be hereinafter described, which extend along these edges and will be moved along in contact with these rollers until they reach a place where the space is of sufficient width to allow them to drop through. Each of these spaces beneath the adjustable plates communicates through a directing chute or receptacle, so that fruit which has passed through may be received and kept separate from the other fruit. Around the lower edges of these adjustable plates are curved shafts or rods, as at 11, supported by suitable brackets, so that they are raised and lowered with the plates. Upon these rods are loosely fitted a series of disks 12, which are freely turnable upon their rods and which form a continuous contact for the sides of the fruit, which resting upon the inclined bottom surfaces will also contact against these loose rings or disks. The movement of the bottom 3, which is caused to travel around in this circular channel, and the contact of the fruit with these rings produces a revolving motion of the fruit, which while being carried forward by the moving bottom revolves backwardly and upwardly, and the disks or rings are acted upon by the revolving fruit and caused to rotate upon their supporting-rods. This provides a contact-surface for the fruit which is freely movable, and which revolving in the opposite direction or upwardly prevents the fruit from being pinched when it arrives at spaces which are nearly large enough to allow it to pass, and it will thus be retained in the channel until it arrives at a space which is sufficiently large for it to fall through. The gradation of these spaces may be regulated by the adjustment of the plates 8, so that the offsets from one to another may be of any desired size.

In order to regulate the delivery of the fruit from the chute A and to distribute it evenly upon each side of the apex of the bottom 3, I have shown a directing-board 13, which is mounted in the discharge end of the chute and bent as shown, so that the oranges or other fruit will be divided by it and delivered into the channel upon each side of the bottom 3, and by its construction and arrangement they will be delivered singly, so as to prevent their crowding or piling upon each other.

Having thus described my invention, what I claim as new, and desire to secure by Letters Patent, is—

1. The combination, in a fruit-grader, of a ring or disk forming a bottom and having beveled or sloping edges, means for rotating the disk, vertical guides surrounding and extending above said edges, and means whereby the lower edges of the guides are vertically adjusted toward and from the edges of the disk to regulate the size of the fruit-discharge.

2. A fruit-grading apparatus consisting of a revoluble ring or disk having beveled or inclined edges upon which the fruit rests, vertical surrounding contact-surfaces for the fruit consisting of slotted adjustable plates above said ring or disk, and means for securing said plates whereby the spaces between the ring or disk and the lower edges of the plates may be regulated.

3. A fruit-grader consisting of a horizontally-revoluble disk or ring having a beveled or inclined edge or surface upon which the fruit rests while being advanced, and guides surrounding and extending above said beveled surface, said guides having the lower edges provided with a series of loosely-turnable disks or rollers forming contact-surfaces against which the fruit rests.

4. A fruit-grader, consisting of a disk or ring having a beveled edge or edges, forming a surface or support for the fruit, and vertical guides against which the fruit bears, said guides consisting of vertically-adjustable plates concentric with the disk or ring, having a series of journaled disks revoluble in radial planes around their lower edges.

5. A fruit-grader consisting of a horizontally-revoluble disk or ring having a beveled upper edge or edges upon which the fruit rests, curved slotted plates concentric with the periphery of the disk or ring having radially-revoluble rollers journaled upon their lower edges forming contact-surfaces for the fruit, and means engaging the slots in the plates by which said plates are vertically adjusted with relation to the horizontal disk or ring so as to form a series of spaces, increasing in width from the point where the fruit is received around the circle whereby different sizes of fruit are allowed to escape through said spaces during their advance.

6. The combination in a fruit-grading apparatus of a horizontally-revoluble disk or bottom having a beveled or inclined edge forming a surface upon which the fruit rests, a series of vertically-adjustable concentrically-disposed guides having rollers journaled and turnable upon their lower edges, against which rollers the fruit also rests while advancing, said guides forming, in conjunction with the revoluble disk or ring, a series of gradually-increasing spaces through which the different sizes of fruit escape as they arrive.

7. The combination in a fruit-grading apparatus of a horizontally-revoluble disk or ring having a beveled edge or edges forming a supporting-surface for the fruit, adjacent concentrically-curved plates having revoluble rollers journaled around their lower edges, between which rollers and the disk the fruit also rests, means by which said plates are vertically adjusted to present spaces of gradually-increasing diameter between the rollers and the supporting edges of the disk or ring, and chutes or receptacles into which each grade of fruit thus escaping is received.

8. The combination in a fruit-grading apparatus of a horizontally-revoluble disk or ring having a beveled edge or edges forming a supporting-surface for the fruit, adjacent concentrically-curved plates having revoluble rollers journaled around their lower edges, between which rollers and the disk the fruit also rests, means by which said plates are vertically adjusted to present spaces of gradually-increasing diameter between the rollers and the supporting edges of the disk or ring, chutes or receptacles into which each grade of fruit thus escaping is received, and a supply-chute and regulating and directing gate by which the fruit is separated and delivered singly upon the beveled surface or surfaces.

In witness whereof I have hereunto set my hand.

RICHARD G. BAILEY.

Witnesses:
S. H. NOURSE,
CHAS. E. TOWNSEND.